Jan. 30, 1951    S. R. RICH    2,539,553
RECORDING SYSTEM
Filed Oct. 19, 1945    2 Sheets-Sheet 1
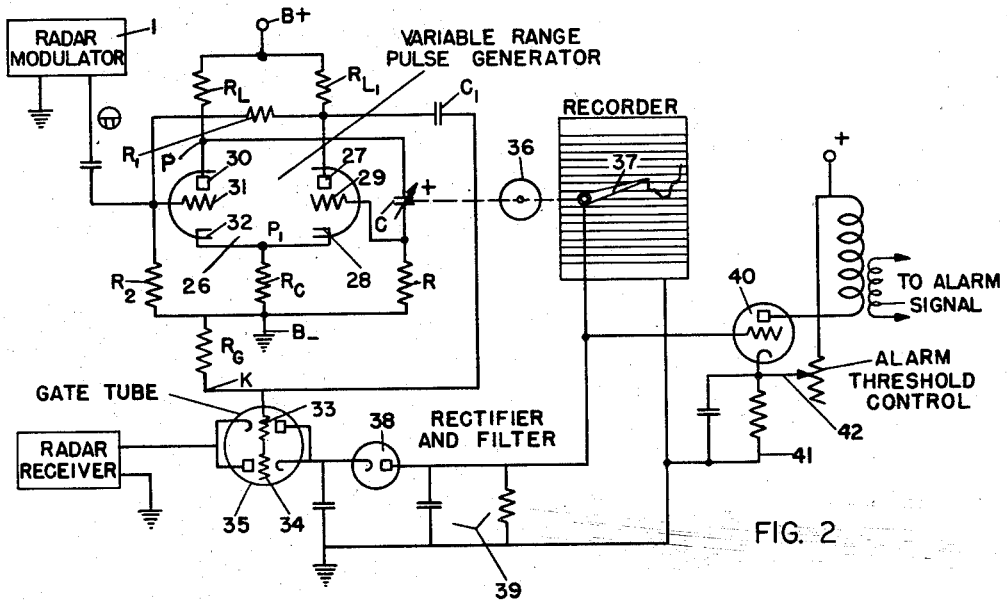
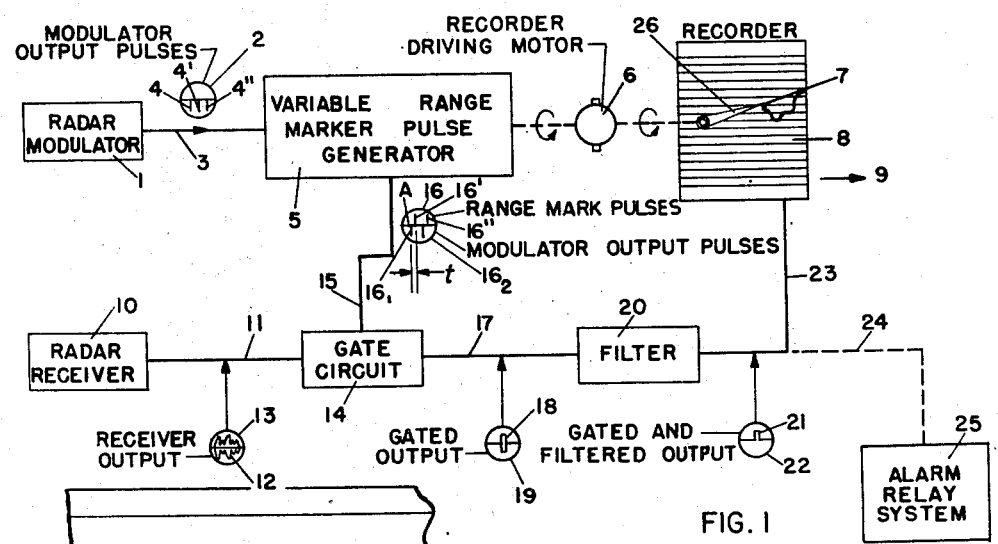
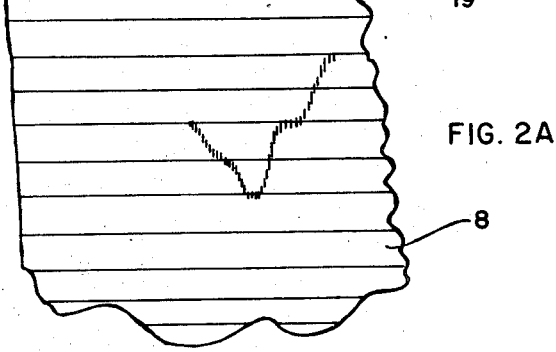
FIG. 2A
INVENTOR.
STANLEY R. RICH
BY
HIS ATTORNEY Jan. 30, 1951  S. R. RICH  2,539,553
RECORDING SYSTEM Filed Oct. 19, 1945  2 Sheets-Sheet 2

INVENTOR.
STANLEY R. RICH
BY
HIS ATTORNEY

Patented Jan. 30, 1951

2,539,553

UNITED STATES PATENT OFFICE 2,539,553

RECORDING SYSTEM

Stanley R. Rich, Cambridge, Mass., assignor, by mesne assignments, to Raytheon Manufacturing Company, a corporation of Delaware Application October 19, 1945, Serial No. 623,347

4 Claims. (Cl. 346—33)

The present invention relates to a system for producing a permanent record of measurements involving events which occur or vary with great rapidity and which are difficult to record because the recording as a rule consumes a much greater time interval than the happening of the complete event. As an illustration of the application of the present invention reference is made to the measurement of distances by means of the time of travel of an impulse of electromagnetic waves from a point of emission to a point of reception in a course involving a reflected wave or the time difference of travel of waves sent over different paths.

The present invention may be applied to the so-called radar systems which have been quite generally used in this country and abroad and also to other systems involving radio pulse transmission in determining distance and direction by triangulation or other methods involving observations from one or more stations. The purpose of the present invention is principally to produce upon a permanent record the time interval measurement between the arrival of two electrical pulses without the use of any rapidly moving mechanism. At the present time events of this nature are made visible principally by the use of cathode ray oscilloscopes in which a beam is swept over a fluorescent screen which may be provided with sufficient persistence so that the travel of the beam produces a visual record. In the present invention as applied to radar and as applied to triangulation or other measurements in the measurement of the time interval between electrical pulses received from different sources or from the same source, intervals of measurement are of the order of one microsecond. Since this time element is so extremely short, it is impossible to give any magnitude on a means such as a recording paper by the movement of a stylus. Yet in the present invention the record is produced by a recording stylus which may be stationary or may be moved, if desired, at a very slow rate. The means and method of accomplishing this result are extremely simple both in design and construction and, further, the device employed avoids the use of any high voltage in the system.

The invention will be more fully described in connection with the specification annexed hereto when read in connection with the drawings illustrating the embodiment of this invention in which Fig. 1 shows a block circuit diagram of the system;

Fig. 2 shows a circuit diagram of the system as set forth in Fig. 1 with the circuit in detail;

Fig. 2A is an enlarged illustration of the sample record made; and

Figure 3:
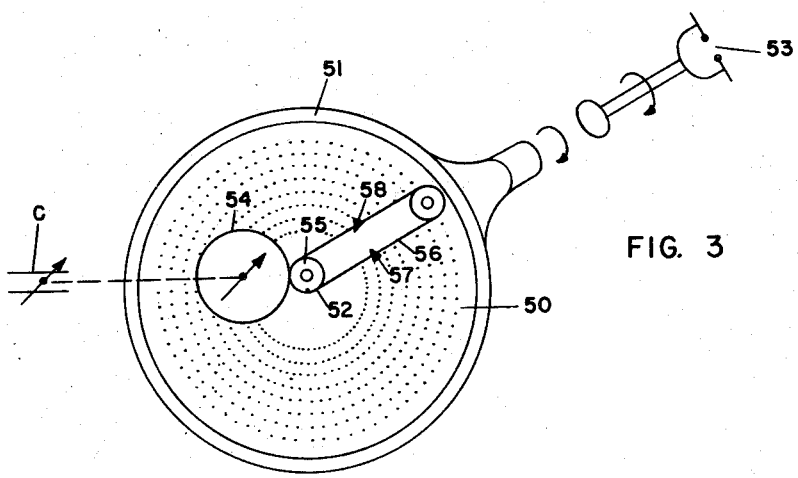
Fig. 3 shows diagrammatically a detail of the arrangement of Fig. 2.

In the system described in Figs. 1, 2 and 3 the ultra high frequency radio pulse, if such is used, may be produced in the usual fashion through a radar modulator 1, the pulse outputs being substantially as shown in the circle 2 positioned over the line 3 of Fig. 1. If, for instance, a ten centimeter wave is used and the pulse is one microsecond long, then each line 4, 4', 4" in the circle 2 will represent a one microsecond pulse comprising 3000 oscillations corresponding to the ten centimeter wave length. These pulses are impressed over the cable 3 on a variable range marker, pulse generator 5, which device controls the range at any instant for which the system is operating. The device 5 more accurately perhaps may be described as controlling the interval of measurement. At any instant in a cycle of operation the device will respond to a measurement of a certain time interval. The interval to which the device 5 will respond is varied progressively through a cycle corresponding to the intervals under observation as, for instance, the range for which the device is to operate if it is used for distance measuring. The details of operation of this means will be described later.

As indicated in Fig. 1, however, the device may be controlled by a motor 6 which synchronously drives also a recording stylus 7 moving over a recording paper 8 in the direction of the arrow 9. As shown further in Fig. 1 the pulse transmitted through the modulator 1 may be reflected from a distant object and received on the radar receiver 10, the output of which impressed over the cable 11 would appear as indicated by the curve 12 within the circle 13. The curve 12 represents the envelope of the wave. This receiver output is impressed upon the gate circuit 14 which is controlled by the variable range marker pulse generator 5 to pass a pulse or pulses in accordance with the timed operation of the generator 5; that is to say, if the device is used for distance measurement by reflection, the gate circuit will be opened to pass a reflected pulse occurring at a selected time after the occurrence of the direct pulse.

For this purpose the circuit 5 is connected to the gate circuit by means of a cable 15 and the pulses impressed over the cable 15 are indicated in their time spaced positions by means of the vertical marks 16' and 16''; the direct pulses corresponding to these pulses are indicated by the lower vertical lines 16₁ and 16₂. The time interval $t$, for which the gate circuit 14 under these circumstances is set, is represented by the distance $t$ between the vertical markers 16₁ and 16'. It will be noted in the circle 16 that one set of vertical marks is above and one set below the horizontal line A. As applied to the gate circuit 14 the set of pulses on one side of the line provides no operation of the gate circuit as the applied potential over the line 15 is in the wrong direction while the other set opens the gate circuit momentarily to permit a pulse impressed over the cable 11 to operate the system.

The gate circuit 14 will be operated during the time interval $t$, which interval begins in synchronism with the direct pulse. The gate output transmitted over the line 17 is represented by the wave 18 in the circle 19. This may be filtered by the filter 20 and rectified to produce a wave form as indicated at 21 in the circle 22 as the output of the filter over the cable 23 which energizes the recording stylus 7. The system may also include an alarm relay 25 connected over the cable 24 which may operate when the interval becomes shorter than a desired value.

Since the rotational position at any instant of the arm 26 of the stylus 7 is associated with a specific time interval through the variable range generator 5, the position of the arm 26 at the instant that a record is produced will correspond to a particular time interval or distance measurement. The recording paper 8 may be calibrated in time intervals, distance or any other suitable calibration and the position at which a record is produced will indicate such a measurement.

The circuit for the operation of the system is shown more in detail in Fig. 2. In the variable range pulse generator two individual or a double triode tube 26 may be employed in which one set of electrodes comprises the anode 27 and cathode 28 and a grid 29 and the other set comprises anode 30, the cathode 32 and a grid 31. The direct impulse is impressed upon this variable range marker pulse generator by means of the radar modulator 1 corresponding to the same element in Fig. 1. Any other type of pulse may, however, be used as an initial marker in the measuring system; for instance the pulse may be one received from one of two stations for the purpose of distance measurement or the pulse may be one of two successive pulses received from a given station. The chief function of the element 1 in the system is to establish the beginning of the interval to be measured and this interval may be obtained or set up in any of a great number of ways. In the circuit of Fig. 2 potential is supplied between the points marked B— and the points marked B+, thus establishing a voltage drop in the circuit including $R_{L1}$, $R_1$ and $R_2$ which remains a completed circuit between the positive and negative supply. If the triode group 30, 31 and 32 were not conducting under these conditions the potential established as result of the resistance $R_{L1}$, $R_1$ and $R_2$ could be so chosen that conduction normally will occur in this triode section. When conduction does occur a voltage drop appears between the cathode 32 and B— because of current flowing through the resistor $R_c$. Under normal conditions therefore the potential drop between the grid 31 and ground, as compared to the cathode 32 and ground, should be such as to provide a positive bias on the grid 31 under normal operating conditions. It should also be noted that when the triode group 30, 31 and 32 conduct, a considerable drop in potential is provided across the resistance $R_L$ which is directly in the plate circuit of the triode group 30, 31 and 32. This drop depresses the positive potential of the point $p$.

The triode group 27, 28 and 29 is made normally nonconducting. Under these conditions the grid 29 is at a potential established by the drop across the resistance $R_L$ and the resistance $R$. Since current is passing through the resistance $R_L$ and none through the resistance $R$, the grid 29 is substantially at the B— potential with the cathode 28 at a point of positive potential with reference to the grid 29. This is the normal steady-state condition before a negative pulse is impressed upon the grid 31 normally blocking the flow of current through the triode group 30, 31 and 32. When this pulse has been impressed upon the grid 31 very rapid action occurs not only to cut off the flow of current through the group 30, 31 and 32, but to put into operation the timing circuit which will eventually provide a positive pulse on the grids 33 and 34 of the gate tube 35 in the manner which will be explained later. The immediate effect of the cut-off of current flow in the triode group 30, 31 and 32 is to raise the potential of the point $p$ towards B+ which automatically raises the potential of the grid 29 permitting current to flow in the triode group 27, 28 and 29. At the same time that the potential of the point $p$ is raised, the potential of the point $p_1$ is lowered, thus increasing the cathode-anode drop in the triode group 27, 28 and 29.

The raising of the potential of the point $p$ increases substantially practically simultaneously the potential across the condenser $c$ and causes the large instantaneous current to flow through the resistance $R$ thus raising the potential of the grid 29. All these factors tend to establish a quick change-over from current flow in the triode group 30, 31 and 32 to current flow in the triode group 27, 28 and 29 with a shut off of current in the triode group 30, 31 and 32. The result of current flow in the triode group 27, 28 and 29 brings about an increased drop in the resistance $R_{L1}$ and thereby reduces the potential across the condenser $c_1$ which will then begin to discharge through the resistance $R_G$ bringing the point K to a more negative potential thus maintaining a cutoff in the gate tube 35. While the condenser $c$ continues to charge, a relatively positive potential will be maintained upon the grid 29 which, however, will drop when the condenser $c$ has become charged and the current flowing through the resistor $R$ begins to decrease. At some point the grid 29 will become sufficiently negative relative to the cathode 28 so that the triode group 27, 28 and 29 will no longer continue to conduct current. This action of cut off of current in the triode group 27, 28 and 29 will occur as rapidly as it began and as a result the potential drop across the resistance $R_{L1}$ will become zero. The condenser $c_1$ will thereupon have its terminal potential increased and will begin to charge thus impressing a positive potential between the points B— and K or producing a positive pulse on the grids 33 and 34 of the gate tube 35. The action described above between the instant of the negative pulse impressed upon the grid 31 and the positive pulse produced across the resistance $R_G$ occurs in the time interval $t$ established between the negative pulse 16₁ and 16' as indicated in the circle 16 in Fig. 1. This time interval $t$ is established by setting of the condenser $c$ which may be made to change its value constantly by means of the motor 36 which at the same time controls the rotation of the recorder arm 37. Time constant of the variable range pulse generator is therefore established by the setting of the condenser $c$ and this therefore also establishes the time interval which the system will measure. The system will record only that time interval and none smaller or greater. As a result, therefore, no pulse is received unless the interval corresponds to the interval being measured. In distance measurement therefore the receipt of the reflected pulse must coincide with the condenser setting at the instant that the pulse is received. In the visual radar methods employing cathode ray tubes, the sweeping beam is moved at a very high velocity. It would be impossible to move the recording arm 37 at this high velocity. This, however, is unnecessary in the system employed in the present invention. In the present case the recording arm is moved comparatively slowly at any desired speed, as, for instance, perhaps one revolution a second. The changes in the condenser setting under these conditions are negligible in comparison to the measurement being made. Over a one-degree motion of the condenser a great number of measurements are made, at least a great number of impulses are transmitted, and if the condenser is set for the distance being measured a great number of impulses will also be received. In this way the variable range pulse generator acts as a sampling device to sample a section of the range being observed. If it so happens that the range being observed is the one from which echoes or reflections are received then a record will be produced. The record of a single moving target may then consist of a series of short marks on the paper 8, one mark being made during each sweep of the arm 37, as shown in detail in Fig. 2A. If, however, there is no object at that range no echoes will be received and no mark will be made. In this way the very small intervals of time are recorded without any rapidly moving recording elements. In the same way that the range may be sampled other means may be employed to produce alarm signals for certain critical conditions in the circuit of Fig. 1. In addition to the recorder 37, after the impulse has been passed through the rectifier 38 and the filter 39, in preparation to being impressed upon the recorder 37, an alarm circuit device may also be employed including the triode tube 40 and the time control circuit 41 which may be adjusted by means of the potentiometer element 42 for the desired time interval operation.

In distance measurement this may be set to operate an audible alarm when the interval is less than a certain definite magnitude which would indicate the dangerous presence of an obstacle such as a ship, iceberg or the like. The arrangement in Fig. 3 indicates the application of the system of Fig. 2 in connection with a radar system.

The recording paper 50 mounted on a plate 51 may be rotated about a center 52 in synchronism with the rotation of the directional antenna 53. This may be independent of the rotation of the condenser $c$ corresponding to the same element in Fig. 2. Rotated with the condenser $c$ is the driving gear 54 which drives the gear 55 and the recording stylus belt 56 carrying the recording styli 57 and 58. On the recording paper 50 distances are measured radially outward from the center 52 so that the recording stylus belt 56 is radially positioned with respect to the center 52 of the paper 50. The distance between the zero mark of the paper 50 and the longest range will correspond with one revolution of the condenser $c$ and this is accomplished by suitably proportioning the gear ratios between the gear 54 and the gear 55.

It will be seen, therefore, that the radial direction from the point 52 outward on the paper 50 is the direction from which the reflection is returning because of the direction out of a directional antenna. The paper 50 will, therefore, give a graphical picture of the location of the surrounding reflecting objects about the observation station which would be reported by the point 52. Where the vessel is moving these observations will trace a line which will show a recession from the center 52. If desired the paper, after a certain limited time operation, may be replaced by a new paper, thus providing successive pictures of the obstacles in the vicinity of the observing station.

Having now described my invention I claim:

1. A system for measuring short time intervals between two electric pulses marking the beginning and end of an interval being measured which comprises a variably delayed pulse generator upon which the impulse marking the beginning of the interval is impressed, said delayed pulse generator including a time delay establishing condenser of which one set of plates is rotatable with respect to the other to vary the capacitance, a recording stylus, means for supporting a record sheet disposed in cooperative relation therewith, means mounting said stylus for cyclically repeated motion over said sheet, means for synchronously varying the magnitude of the condenser capacity with the position of the stylus in accordance with a time calibrated scale, the variation of magnitude of said condenser controlling the magnitude of delay in the delayed pulse generator, a gate circuit, means for impressing the pulse marking the end of the time interval on said gate circuit, means operated by said delayed pulse for momentarily opening said gate circuit and means for operating said stylus through said gate circuit by the pulse marking the end of the time interval whereby the time interval measurement is recorded.

2. A system for measuring short time intervals between two electric pulses marking the beginning and end of an interval being measured which comprises a delayed pulse generator including a variable time measuring circuit, a cyclically variable condenser in said time measuring circuit as the measuring element thereof, a time indicator including means for supporting a record sheet and a cooperating stylus disposed cyclically to traverse said sheet, means including a mechanical link between said stylus and a plate of said condenser which link simultaneously moves said stylus over said sheet and varies the capacitance of said condenser for synchronously varying the time measuring circuit and the time indicator, a gate circuit, means for impressing the pulse marking the end of the time interval on said gate circuit, means operated by the delayed pulse for momentarily opening said gate circuit and means for indicating the transmission of the pulse marking the end of the time interval through the gate circuit, said means including in part said time indicator.

3. A system for measuring short time intervals between two electric pulses marking the beginning and end of an interval being measured which comprises means for supporting a record chart having time interval indicia thereon, marking means having a member movably disposed adjacent said chart which member bears an instrument which is adapted to make a mark on the chart corresponding to a certain time interval when actuated, a delayed pulse generator including a circuit element having two mechanically relatively movable parts the relative movement of which varies the magnitude of said element and thereby the magnitude of delay in said generator, said generator being arranged to receive and be actuated by the first electric pulse to produce a delayed pulse of which the delay corresponds to said certain time interval, means mechanically connecting together said member and one of the parts of said circuit element, said marking means through this connection being disposed to indicate on said chart the delay provided by said generator, a normally closed gate circuit connected to said generator to be opened by the delayed pulse, and means to impress the pulse marking the end of the time interval on the marking means through said gate circuit, to effect actuations of the marking means when the time interval between the pulses corresponds to the amount of the delay of the delayed pulse.

4. A system for measuring short time intervals between an electric pulse periodically repeated and a second pulse occurring thereafter within an unknown time shorter than the repetition period of the first pulses comprising means for supporting a record chart having time interval indicia thereon, marking means having a member movably disposed adjacent said chart which member bears an instrument which is adapted to make a mark on the chart when actuated, a variable delayed pulse generator arranged to receive and be actuated by each first electric pulse to produce a delayed pulse, means including a circuit element having two relatively movable parts the relative movement of which varies the magnitude of said element and thereby the magnitude of delay in said generator, means connected to one of said parts to vary cyclically the delay of said generator at a slow rate compared to the repetition rate of said first pulse, means mechanically linking said member to said one part of said delay varying means for motion over said indicia such that the position of the marking means over the indicia is at all times in correspondence with the amount of delay of the delayed pulses, a normally closed gate circuit connected to said generator to be momentarily opened by each of the delayed pulses, and means to impress each second electric pulse on the gate circuit and through that circuit when open on the marking means to make a record of the time interval between each recorded second pulse and its first pulse.

STANLEY R. RICH.

REFERENCES CITED

The following references are of record in the file of this patent:

UNITED STATES PATENTS

| Number | Name | Date |
|---|---|---|
| 2,009,459 | Tenner | July 30, 1935 |
| 2,012,837 | Tear | Aug. 27, 1935 |
| 2,416,320 | Jeanne | Feb. 25, 1947 |
| 2,429,623 | Hoisington | Oct. 28, 1947 |
| 2,432,454 | Skellett | Dec. 9, 1947 |
| 2,446,244 | Richmond | Aug. 3, 1948 |